US010317235B2

(12) United States Patent
Ishikawa et al.

(10) Patent No.: US 10,317,235 B2
(45) Date of Patent: Jun. 11, 2019

(54) DRIVING ASSISTANT SYSTEM

(71) Applicant: International Business Machines Corporation, Armonk, NY (US)

(72) Inventors: Nobuyuki Ishikawa, Yokohama (JP); Masakuni Okada, Abiko (JP); Takeyuki Shimura, Kawasaki (JP); Hiroki Yoshinaga, Urayasu (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/795,989

(22) Filed: Oct. 27, 2017

(65) Prior Publication Data

US 2018/0136002 A1     May 17, 2018

Related U.S. Application Data

(63) Continuation of application No. 15/350,381, filed on Nov. 14, 2016.

(51) Int. Cl.
| | |
|---|---|
| *G01C 21/36* | (2006.01) |
| *B60W 50/00* | (2006.01) |
| *G06K 9/00* | (2006.01) |
| *G01C 21/32* | (2006.01) |
| *G06F 16/29* | (2019.01) |

(52) U.S. Cl.
CPC ......... *G01C 21/3644* (2013.01); *B60W 50/00* (2013.01); *G01C 21/32* (2013.01); *G06F 16/29* (2019.01); *G06K 9/00671* (2013.01); *G06K 9/00791* (2013.01)

(58) Field of Classification Search
CPC .... G01C 21/3644; G01C 21/32; B60W 50/00
USPC .......................................... 348/118
See application file for complete search history.

(56) References Cited

U.S. PATENT DOCUMENTS

| | | | | |
|---|---|---|---|---|
| 6,339,746 | B1* | 1/2002 | Sugiyama | G01C 21/3644 340/323 R |
| 2004/0198395 | A1* | 10/2004 | Kimoto | G01C 21/26 455/456.1 |
| 2012/0136505 | A1* | 5/2012 | Mori | G01C 21/3602 701/1 |

(Continued)

OTHER PUBLICATIONS

List of IBM Patents or Patent Applications Treated as Related (Appendix P); Filed Oct. 27, 2017, 2 pages.

(Continued)

*Primary Examiner* — Jeffery A Williams
(74) *Attorney, Agent, or Firm* — Cantor Colburn LLP; Reza Sarbakhsh

(57) ABSTRACT

Driving assistant systems and computer-implemented methods for improving landmark-based route guidance are provided. The computer-implemented method includes receiving, by a processor, image data including one or more landmarks. The computer-implemented method further includes identifying, by the processor, a candidate landmark within the image data. The computer-implemented method further includes presenting, by the processor, the candidate landmark to a user. The computer-implemented method further includes, in response to the user accepting the candidate landmark, storing, by the processor, the candidate landmark and a location of the candidate landmark.

8 Claims, 7 Drawing Sheets

(56) References Cited

U.S. PATENT DOCUMENTS

2017/0146349 A1* 5/2017 Yang .................... G01C 21/005

OTHER PUBLICATIONS

Nobuyuki Ishikawa, et al. "Driving Assitant System," U.S. Appl. No. 15/350,381, filed Nov. 14, 2016.
Ishikawa, Nobuyuki et al. "Driving Assistant System," U.S. Appl. No. 16/140,580, filed Sep. 25, 2018.
List of IBM Patents or Patent Applications Treated as Related (Appendix P); Filed Sep. 25, 2018, 2 pages.

* cited by examiner

DRIVING ASSISTANT SYSTEM

DOMESTIC AND/OR FOREIGN PRIORITY

This application is a divisional of U.S. application Ser. No. 15/350,381, titled "DRIVING ASSISTANT SYSTEM" filed Nov. 14, 2016, the entire contents of which are incorporated herein by reference.

BACKGROUND

The present invention relates in general to navigation systems, mapping, and route guidance. More specifically, the present invention relates to a driving assistant system and computer-implemented method for improved landmark-based route guidance functionality.

Automotive navigation systems (also known as route guidance systems) are often satellite-based navigation systems designed for use in private and commercial vehicles. Most systems use a combination of Global Positioning System (GPS) data and digital map-matching to calculate a variety of routes, such as the shortest route to a specified destination. The systems conventionally present a map overview and turn-by-turn instructions to drivers using a combination of auditory and visual information. Navigation systems typically equipped in a vehicle generally guide a driver by indicating a distance and an intersection name at which the driver is supposed to make a turn, e.g., "turn right in 200 feet." Realizing that driving often evokes a driver's memories of landmarks such as signs, stores, and landscapes, some existing navigation systems provide guidance by superimposing picture images upon a fork or an intersection of a road depicting a landmark found therein in a highlighted state.

SUMMARY

According to embodiments of the present invention, a computer-implemented method for improving landmark-based route guidance is provided. The computer-implemented method includes receiving, by a processor, image data including one or more landmarks. The computer-implemented method further includes identifying, by the processor, a candidate landmark within the image data. The computer-implemented method further includes presenting, by the processor, the candidate landmark to a user. The computer-implemented method further includes, in response to the user accepting the candidate landmark, storing, by the processor, the candidate landmark and a location of the candidate landmark.

According to embodiments of the present invention, a system for improving landmark-based route guidance is provided. The system includes a memory having computer readable instructions and a processing device for executing the computer readable instructions. The computer readable instructions cause the processing device to receive image data including one or more landmarks and to identify a candidate landmark within the image data. The computer readable instructions further cause the processing device to present the candidate landmark to a user and, in response to the user accepting the candidate landmark, store the candidate landmark and a location of the candidate landmark.

According to embodiments of the present invention, a computer program product for improving landmark-based route guidance is provided. The computer program product includes a computer readable storage medium having program instructions embodied therewith, the program instructions executable by a processing device to cause the processing device to perform a method. The method can include receiving image data including one or more landmarks and identifying a candidate landmark within the image data. The method can also include presenting the candidate landmark to a user and, in response to the user accepting the candidate landmark, storing the candidate landmark and a location of the candidate landmark.

BRIEF DESCRIPTION OF THE DRAWINGS

The subject matter of the present invention is particularly pointed out and distinctly defined in the claims at the conclusion of the specification. The foregoing and other features and advantages are apparent from the following detailed description taken in conjunction with the accompanying drawings in which:

DETAILED DESCRIPTION

Figure 1:
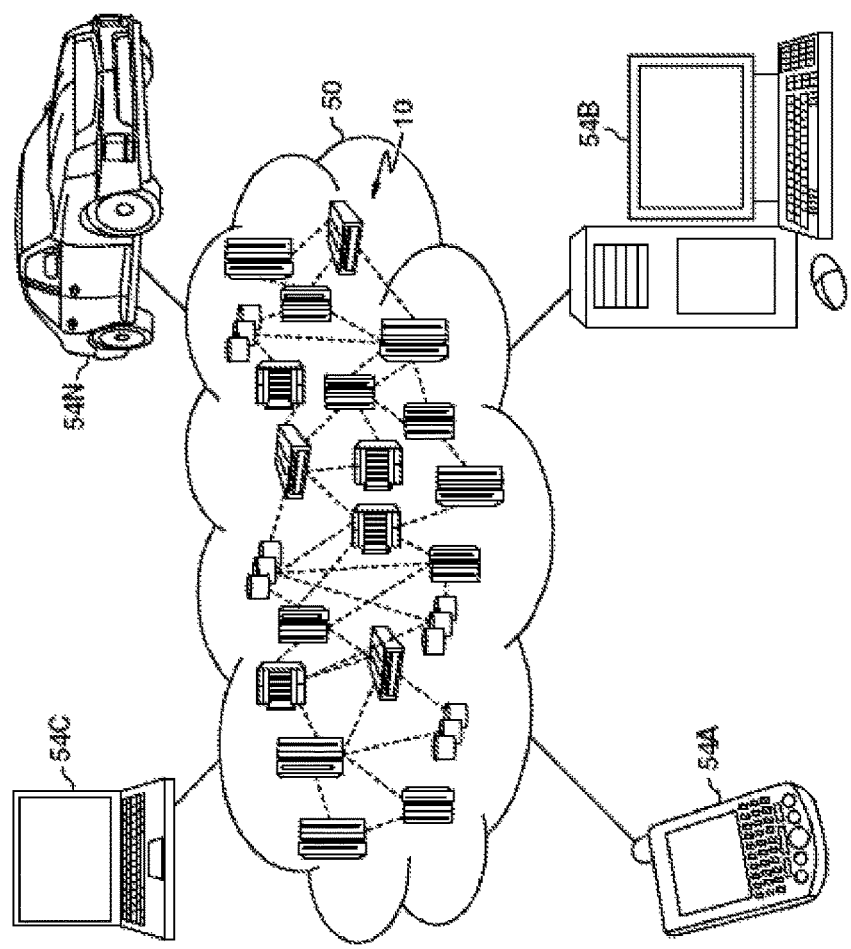
FIG. 1 depicts a cloud computing environment according to an embodiment of the present invention.

In accordance with one or more embodiments of the invention, driving assistant systems, methods, and computer program products for improving landmark-based route guidance functionality are provided. Various embodiments of the present invention are described herein with reference to the related drawings. Alternative embodiments can be devised without departing from the scope of this invention. References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

For the sake of brevity, conventional techniques related to computer processing systems and abstraction models may or may not be described in detail herein. Moreover, it is understood that the various tasks and process steps described herein can be incorporated into a more comprehensive procedure, process or system having additional steps or functionality not described in detail herein.

Turning now to a detailed description of the present invention, as previously noted herein, some existing navigation systems provide guidance by superimposing landmark images upon a fork or an intersection of a road in a highlighted state. These landmarks are presented to the driver to allow for a more natural route guidance experience. Conventional systems typically store landmark data client or server side with the bulk navigation data. The landmark data, which is otherwise static, can be periodically updated by the system.

Landmark-based navigation offers drivers several advantages over less sophisticated systems. There are several problems, however, with the conventional approach to landmark-based navigation systems. First, the highlighted landmark is not selected by the driver. Instead, conventional systems tag or otherwise associate landmark data with navigation data and a particular landmark is automatically displayed to the driver in response to the driver's location. As such, there is no nexus between what an individual driver recognizes as a landmark and the landmark provided to that driver by the system. A driver can feel anxious when a landmark displayed by the system is different than the landmark the driver remembers. Next, while the selection of landmarks can be periodically updated, the landmarks themselves are not adaptive (i.e., the landmarks as displayed to a driver do not account for changes to the landmark itself over time). A driver can become confused when a landmark displayed by the system has been updated in response to a change in the landmark. For example, a driver that relies on a particular Chinese noodle shop as a landmark can become confused when the system provides an image of a curry restaurant that recently replaced the noodle shop. Consequently, the driver, looking for the noodle shop, can make a wrong turn or fail to turn at the correct intersection. Thus, driving assistant systems, methods, and computer program products for improving landmark-based route guidance functionality are desired.

One or more embodiments provide a driving assistant system, a computer-implemented method, and a computer product for associating user-specified landmarks with a route and for adaptively tracking changes to the landmarks over time. The system continuously or periodically receives image data from a camera. The system can identify one or more candidate landmarks within the image data and can present the candidate landmarks to a user. The system stores the candidate landmark and metadata associated with the candidate landmark in response to the user confirming the candidate landmark for storage. In this manner, the system is populated over time with a plurality of landmarks specifically selected by the user. The selected landmarks can be more easily recognized by the user than stock or pre-generated landmarks. The system can also compare a position of the user to the location of the landmark. In response to determining that the position is within a threshold distance of the location, the system can compare the stored candidate landmark to an image of the candidate landmark in the current image data to identify a change. This change can be presented to the user. In this manner, the user is made aware of any changes in the appearance of the landmark which occurred after the user stored the landmark.

One or more embodiments of the invention include or yield various technical features, technical effects, and/or improvements to technology. Example embodiments of the invention provide a driving assistant system configured to perform an automatic, unsupervised process to associate a user-identified landmark with a route location in response to receiving user input. These aspects of the invention constitute technical features that yield the technical effect of tagging a route with adaptive landmarks that avoids the need for manually populating a database with landmark data and the technical effect of using a machine learning technique to progressively improve landmark selection by identifying and storing preferred landmark types for future use. As a result of these technical features and technical effects, a driving assistant system in accordance with embodiments of the present invention represents an improvement to existing landmark-based route guidance. It should be appreciated that the above examples of technical features, technical effects, and improvements to technology are merely illustrative embodiments of the invention and are not exhaustive.

A driving assistant system, a computer-implemented method, and a computer product for improving landmark-based route guidance in accordance with one or more embodiments of the present invention are described in detail below by referring to the accompanying drawings in FIGS. 1-7.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Referring now to FIG. 1, illustrative cloud computing environment 50 for determining whether a target compound can be synthesized using known pathways for similar compounds is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Cloud computing nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
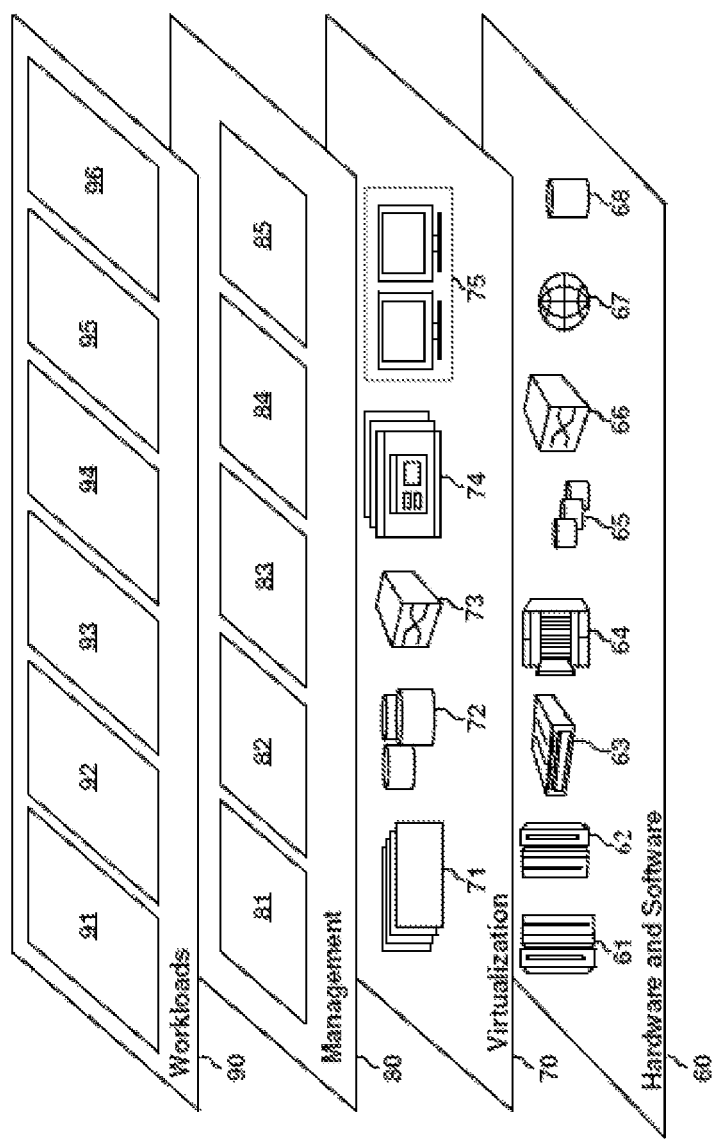
FIG. 2 depicts abstraction model layers according to an embodiment of the present invention.

Referring now to FIG. 2, a set of functional abstraction layers provided by cloud computing environment 50 (FIG. 1) is shown. It is understood that the components, layers, and functions shown in FIG. 2 are intended to be illustrative only and that embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In some embodiments, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Figure 4:
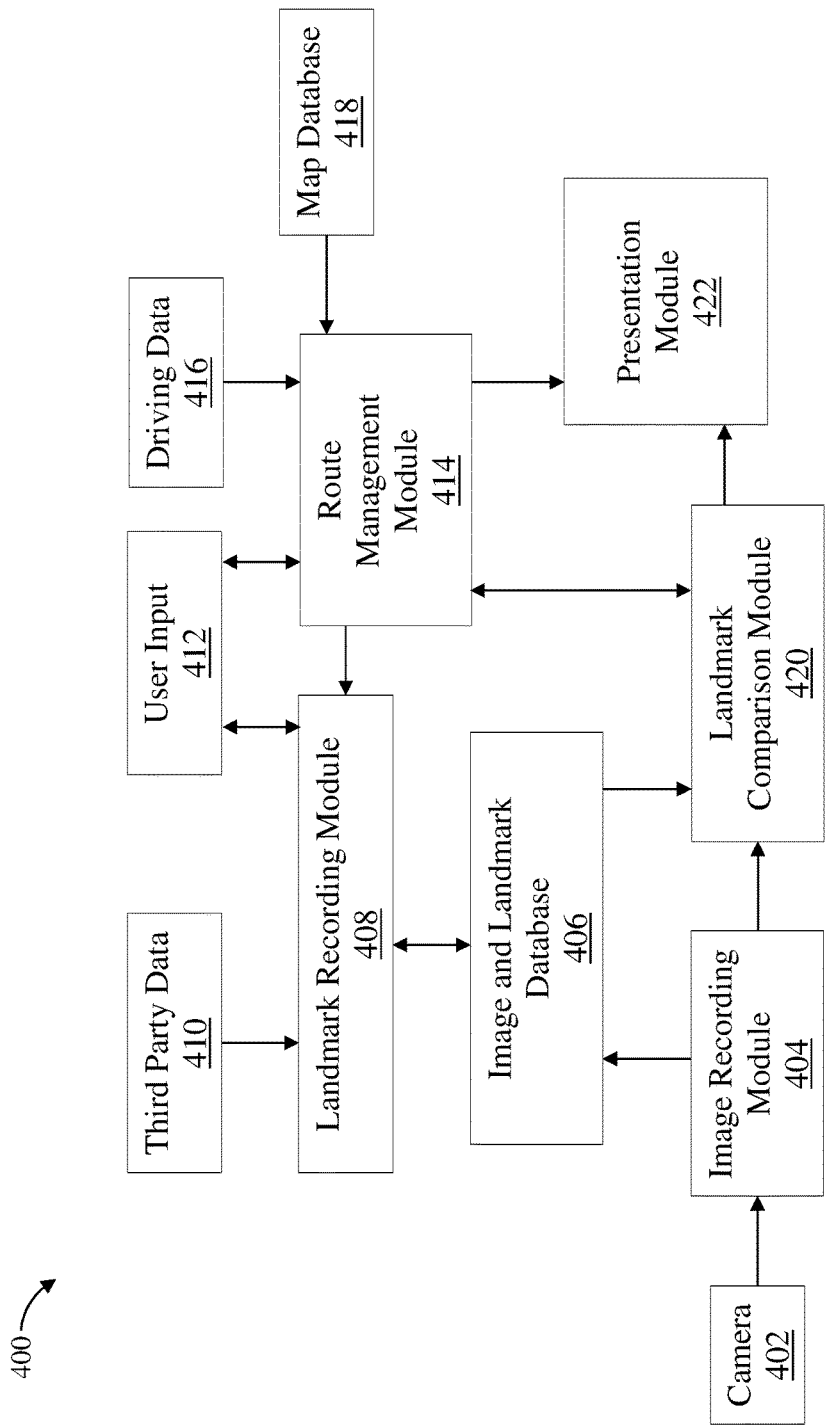
FIG. 4 depicts a block diagram of another processing system for improving landmark-based route guidance functionality according to one or more embodiments of the present invention.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and driving assistant container 96. In some embodiments, driving assistant container 96 provides all or part of the functionality of the processing system 400 (as depicted in FIG. 4).

Figure 3:
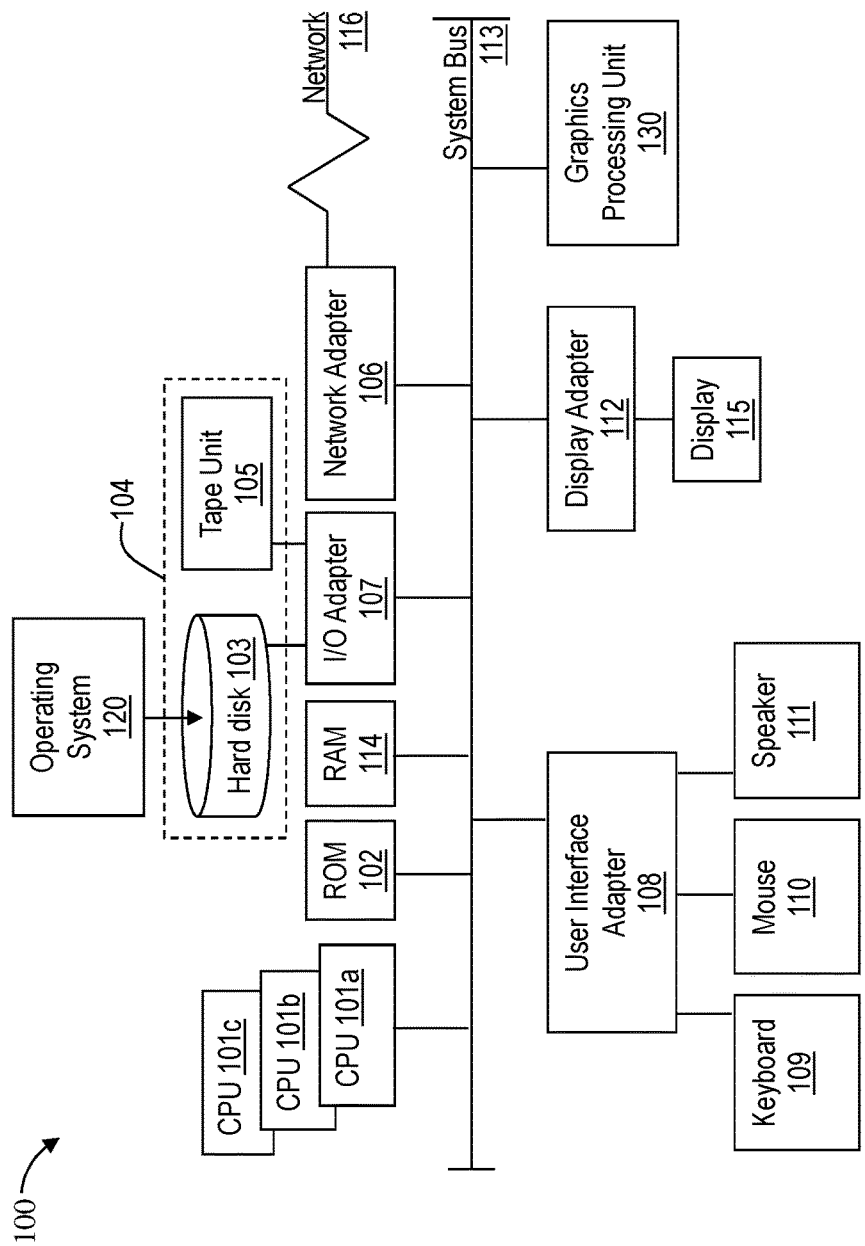
FIG. 3 depicts a block diagram of a processing system for improving landmark-based route guidance functionality according to one or more embodiments of the present invention.

FIG. 3 illustrates a block diagram of a processing system 100 for improving landmark-based route guidance functionality according to one or more embodiments. Processing system 100 can have one or more central processing units (processors) 101*a*, 101*b*, 101*c*, etc. (collectively or generically referred to as processor(s) 101 and/or as processing device(s) 101). In some embodiments, each processor 101 can include a reduced instruction set computer (RISC) microprocessor. Processors 101 are coupled to system memory (e.g., random access memory (RAM) 114) and various other components via a system bus 113. Read only memory (ROM) 102 is coupled to system bus 113 and can include a basic input/output system (BIOS), which controls certain basic functions of processing system 100.

Further illustrated are an input/output (I/O) adapter 107 and a network adapter 106 coupled to system bus 113. I/O adapter 107 can be a small computer system interface (SCSI) adapter that communicates with a hard disk 103, a tape unit 105, or any other similar component. I/O adapter 107, hard disk 103, and tape unit 105 are collectively referred to herein as mass storage 104. Operating system 120 for execution on processing system 100 can be stored in mass storage 104. A network adapter 106 interconnects system bus 113 with an outside network 116 enabling processing system 100 to communicate with other such systems.

A display (e.g., a display monitor) 115 is connected to system bus 113 by display adaptor 112, which can include a graphics adapter to improve the performance of graphics intensive applications and a video controller. In some embodiments, adapters 106, 107, and/or 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 can be interconnected to system bus 113 via user interface adapter 108, which can include, for example, a Super I/O chip integrating multiple device adapters into a single integrated circuit.

In some embodiments, processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 101, storage capability including system memory (e.g., RAM 114), and mass storage 104, input means such as keyboard 109 and mouse 110, and output capability including speaker 111 and display 115. In some aspects of the present invention, a portion of system memory (e.g., RAM 114) and mass storage 104 collectively store an operating system such as the AIX® operating system from IBM Corporation to coordinate the functions of the various components shown in processing system 100.

FIG. 4 illustrates a block diagram of a processing system 400 for improving landmark-based route guidance functionality according to one or more embodiments. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In some embodiments, the engine(s) described herein can be a combination of hardware and programming. The programming can be processor executable instructions stored on a tangible memory, and the hardware can include processor 101 (FIG. 3) for executing those instructions. Thus a system memory can store program instructions that when executed by processor 101 implement the engines described herein. Other engines can also be utilized to include other features and functionality described in other examples herein.

Processing system 400 can include processor 101, camera 402, image recording module 404, image and landmark database 406, landmark recording module 408, third party data 410, user input 412, route management module 414, driving data 416, map database 418, landmark comparison module 420, and presentation module 422. Image and landmark database 406 and map database 418 can each include a single database or one or more databases. In some embodiments, the image and landmark database 406 includes separate image databases and landmark databases. In some embodiments, the image and landmark database 406 and the map database 418 are a single database. In some embodiments, the image and landmark database 406 can be stored on-vehicle or on a cloud communicatively accessible to the processing system 400 over a network. Alternatively or additionally, the processing system 400 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Image recording module 404 receives image data from the camera 402. The image data (also known as route images) can be recording continuously or periodically. In some embodiments, a recording period setting is manually selected by a user (e.g., a driver or a passenger) of the processing system 400. In some embodiments, the recording period setting is selected by the image recording module 404. In some embodiments, the image recording module 404 starts recording image data when the driver starts driving the vehicle (e.g., when the ignition is started or when the car moves). The image recording module 404 transfers image data to the image and landmark database 406 and to the landmark comparison module 420.

Landmark recording module 408 receives image data from the image recording module 404 as well as third party data 410 and user input 412. The landmark recording module 408 identifies landmarks within the image data received from the image recording module 404 and tags the landmarks with route metadata in response to various triggers (i.e., data received from third party data 410 and/or user input 412). The route metadata can include, for example, GPS coordinates, a landmark name, a landmark location, shape, color, size, type, a time, weather at the time, a recording time, a season, a month, a year, a direction, whether the landmark is a Q&A-type landmark, and/or any other suitable metadata for identifying a particular landmark and matching the landmark to a particular location. For example, route metadata for a copse of cherry blossom trees can include "Route 100 cherry blossoms", GPS coordinates, March through April only, left the side of the road. In some embodiments, the metadata includes a user recording. The user recording can be provided, for example, by the user at the time of storing a registered landmark. In some embodiments, the landmark recording module 408 queries a user to provide any desired remarks associated with the landmark. In this manner, the user can improve their ability to recall the landmark in the future. For example, a user could record, "The building is on the left side under a large sign." In some embodiments, the tagged landmarks are stored in the image and landmark database 406. The triggers can include, for example, contextual user speech triggers (e.g., Q&A-type landmarks), user command triggers, automatic route triggers, third party triggers, and user selection triggers.

In some embodiments, the user input 412 includes voice data (speech data) and the landmark recording module 408 includes a voice processing section that monitors the vehicle for voice data containing contextual user speech triggers. In some embodiments, the landmark recording module 408 monitors the vehicle for voice data that indicates a "Q&A-type landmark" which can be passively stored for future use by the system without user confirmation. For example, a Q&A-type landmark speech trigger including conversation data indicating that a user perceives a landmark, such as, for example, "Ah, it's over that sign, isn't it?", "It's right after the statue", "Look at those beautiful cherry blossoms", or "You can see Mount Fuji" can cause the landmark recording module 408 to stored the associated landmark (e.g., the sign, the statue, the cherry blossoms, Mount Fuji) as a Q&A-type landmark at the user's current location. Q&A-type landmarks are landmarks which are not automatically presented to a user the next time the user returns to the landmark location. Instead, Q&A-type landmarks are presented in response to contextual voice triggers in a conversational manner. For example, the phrase "It is beyond the location where the cherry tree used to be." can be presented to the user in response to detecting user or passenger conversation data including phrases such as "Is it near here?" at a location near the previously recorded cherry tree. In another example, a Q&A-type landmark is passively stored by the landmark recording module 408 in response to voice data including "Hey, take a look at the cherry blossoms. So beautiful!" The Q&A-type landmark metadata can include the location of the cherry blossoms, the season, and other metadata information according to one or more embodiments. Eight months later when the user is traveling along the route having the cherry blossoms, the system detects conversation data including "This place looks different than before, there is so much development now. Are we getting close to our turn?" The system can respond with "This is where the beautiful cherry blossoms were last spring. Stay on the route until you reach the next intersection. Make a left." In this manner, a Q&A-type landmark can be presented to a user in a conversational manner to help the user remember the landmark and to boost the user's confidence that the correct route is being taken.

In some embodiments, speech triggers include user conversations indicating a navigation error, such as, for example, "I took the wrong way" or "I should have made a turn there." User commands can include explicit instructions to record a landmark, such as, for example, "Remember that sign", "Save that blue building on the right" or "Save a landmark at the next intersection." In some embodiments, the landmark recording module 408 identifies landmarks within current or recent image data in response to receiving the user commands.

In some embodiments, the landmark recording module 408 receives automatic route triggers from the route management module 414. Automatic route triggers can include predetermined triggers, such as, for example, detour triggers. In some embodiments, the route management module 414 can monitor the expected path that the vehicle is traveling and, in response to detecting that the vehicle has made a detour, the route management module 414 can send an automatic route trigger to the landmark recording module 408. In some embodiments, the route management module 414 can send an automatic route trigger to the landmark recording module 408 in response to detecting that the vehicle has returned to a route after previously deviating from the route.

In some embodiments, the third party data 410 includes third party triggers, i.e., landmark data generated by third party systems. The third party system data can include, for example, data from other drivers using improved landmark-based driving assistant systems according to one or more embodiments. In some embodiments, the landmark recording module 408 filters the received third party triggers using a quality threshold. For example, the landmark recording module 408 can require that a particular third party trigger be used by a predetermined number or percentage of users prior to relying on the third party trigger. In this manner, only the most useful third party triggers result in the landmark recording module 408 identifying landmark for the user. The quality threshold can be predetermined by the processing system 400 or manually configured by the user. In some embodiments, the user can increase or decrease the quality threshold to adjust the number of third party landmarks utilized by the landmark recording module 408.

In some embodiments, the landmark recording module 408 carries out the process of recording a landmark within an image and its associated metadata in response to an intentional operation made by the user (i.e., a user selection trigger). The user input 412 can include, for example, user interface menu selections made by the user to initiate a landmark selection.

Once the landmark recording module 408 receives a trigger, the landmark recording module 408 identifies landmarks within the image data received from the image recording module 404 and tags the landmarks with route metadata (i.e., the landmark is registered). In some embodiments, the landmark recording module 408 uses known image recognition techniques to identify candidate landmarks within the image data. In some embodiments, the landmark recording module 408 presents the candidate landmarks to the user for confirmation. In some embodiments, the landmark recording module 408 elicits voice-based confirmations from the user during the candidate landmark approval process. For example, the landmark recording module 408 can ask the user, "It is this yellow building on the right, isn't it?."

The user can accept or reject the candidate landmark. If accepted, the landmark is tagged with route metadata and stored in the image and landmark database 406. If rejected, the landmark recording module 408 can present a different candidate landmark to the user for confirmation. In this manner, a user can cycle through the candidate landmarks to select a landmark best suited to the individual user. In some embodiments, the user can suspend the approval of a candidate landmark for review at a later time. In some embodiments, the landmark recording module 408 saves the time and route position at which the suspension was designated to ease later review. In some embodiments, the landmark recording module 408 presents candidate route metadata for a landmark after user approval. In some embodiments, the user can approve, reject, or modify the metadata. The landmark recording module 408 stores the tagged landmark after receiving approval of the landmark and metadata. In some embodiments, the user can cancel the landmark registration at any step of the landmark registration process.

In some embodiments, additional tools are provided to increase the accuracy (i.e., the likelihood that a candidate landmark is ultimately accepted by the user) of the candidate landmarks presented to the user by the landmark recording module 408. For example, the landmark recording module 408 can include a line of sight detector to monitor, in real-time, the line of sight data of a user. In response to receiving a trigger, the landmark recording module 408 can use the line of sight data to more accurately predict a candidate landmark. For example, when an utterance "that sign" is made, a candidate of a sign that serves as a landmark is selected from target objects near the direction of the line of sight of the driver and the candidate landmark is presented to the driver. In some embodiments, the tendency of a user to select landmarks of a particular type or of a particular quality (e.g., route metadata) can be learned using machine learning techniques and a candidate landmark of that type can be preferentially presented. In this manner, the landmark recording module 408 can adapt to particular users to improve the selection of personalized landmarks. For example, signs are preferentially presented as candidate landmarks to a driver who frequently selects signs as route landmarks, and buildings having particular colors, hue, and brightness characteristics are preferentially presented to a driver who frequently selects buildings having those particular colors, hue, and brightness as landmarks.

In some embodiments, a user (e.g., a driver or a passenger) can enter user input 412 into the route management module 414 to begin route guidance. The user input 412 includes route selection settings, such as, for example, a destination address. The route management module 414 provides route guidance using known navigational techniques, based on, for example, driving data 416 and a map database 418. The driving data 416 can include, for example, the current GPS coordinates of the vehicle. In some embodiments, the route management module 414 presents route guidance through the presentation module 422. In some embodiments, the presentation module 422 includes a screen and route guidance is displayed to the user on the screen. In some embodiments, the presentation module 422 is coupled to the vehicles sound or speaker system and route guidance is provided to the user through the speakers. In some embodiments, the presentation module 422 uses a combination of visual and verbal instructions to guide the user. In some embodiments, the presentation module 422 includes a windshield projection (also known as a heads-up display, or HUD) for displaying images. In some embodiments, the presentation module 422 can project an image of a landmark and/or a dotted line or other demarcation onto the windshield in the relative direction of the real-world landmark.

In some embodiments, the processing system 400 includes a landmark comparison module 420. The landmark comparison module 420 monitors route data received from the route management module 414 to determine when the vehicle is approaching a registered landmark. When the vehicle approaches a location corresponding to a landmark stored in the image and landmark database 406, the landmark comparison module 420 compares the image of the landmark as stored in the image and landmark database 406 against the visual depiction of the landmark within the image data captured by the camera 402.

In the case where no change is detected between the recorded image of the landmark and the visual depiction of the landmark, the landmark comparison module 420 presents the landmark to the user via the presentation module 422 according to one or more embodiments.

In the case where a change is detected (e.g., a color of a building, a category of a business, a content of a sign, etc.) between the recorded image of the landmark and the visual depiction of the landmark, the landmark comparison module 420 provides a guidance regarding the difference to the user via the presentation module 422. In some embodiments, the guidance is in the form of an image, voice instructions, or a combination of visual and audio cues. For example, the guidance can include, "The yellow building is now painted blue.", "There is a Mexican restaurant in place of the movie theater.", "The sign of the buckwheat noodle shop has been replaced by a sign of a hotel. The color of the sign is white." or "The forest has been developed into a residential area." The guidance can also include, for example, a pair of HUD images depicting the change in the landmark. In some embodiments, the landmark comparison module 420 prompts the user to store an updated image of the landmark. In some embodiments, the landmark comparison module 420 automatically stores an updated image of the landmark.

In the case where the landmark no longer exists, the landmark comparison module 420 provides a guidance informing the user via the presentation module 422. For example, the guidance can include, "The red fast food restaurant which used to be 100 feet ahead on the left side no longer exists." In some embodiments, the landmark comparison module 420 provides alternative landmarks, such as, for example, "Look instead for a firehouse on the right." In some embodiments, the landmark comparison module 420 provides guidance by means of an image and a voice describing the fact that the place the automobile itself is traveling is where the landmark used to be with a description of the difference between the past (e.g., the expected landmark) and the current state (e.g., an alternative landmark). By the explicit presentation of the fact that the location at issue is where the landmark existed, it is made possible to clearly present to the driver the fact that the driver is not driving along an erroneous route. In some embodiments, the landmark comparison module 420 can prompt the user to approve a new landmark to replace the landmark that no longer exists.

In the case where the visibility of the landmark has changed due, for example, to the time of day, weather, or construction, the landmark comparison module 420 provides a guidance informing the user that the landmark exists but that the visibility of the landmark is impaired. In some embodiments, the guidance includes a "current visibility" description. The "current visibility" can be based on either the image data received from the camera 402 or the image data within the third party data 410.

In some embodiments, the landmark as previously recorded by the user is compared against the landmark as obtained by relatively recent third party data 410 (i.e., third party data 410 recorded after the landmark recorded by the user) according to one or more embodiments. In this manner it is possible to compare the stored images of the landmark before the landmark can be seen from the vehicle itself and the information can be presented to the user ahead of time. For example, "In one mile look for a two-story building on the left. The last time you saw the building it was white. Others have reported that the building is now red." Consequently, the user can be informed of any changes to a landmark so that the user can look for the landmark as it currently exists.

In some embodiments, the presentation module 422 alters the guidance based on a positional relationship between a landmark location (e.g., the actual location of the landmark) and a route location associated with the landmark (e.g., an intersection or fork at which a vehicle makes a turn). When the distance between the landmark location and the route location is small (e.g., less than 2000 ft., 1000 ft., 500 ft., 100 ft., 50 ft.) the guidance is provided at the point that the vehicle passes the route location. For example, "Turn right at the traffic light. You will see a red and black Chinese noodle shop to the left of the traffic light." When the distance between the landmark location and the route location is large (e.g., more than 2000 ft., 1000 ft., 500 ft., 100 ft., 50 ft.) or when the landmark is a wide-area landscape (e.g., a "residential area" or a mountain in the distance) the guidance is provided before the vehicle reaches the route location. For example, "In one mile you should be able to see a castle on top of the hill to the left." In some embodiments, distance and time estimates included in the guidance are calculated based on past driving history (e.g., speed or average user and/or third party time from current location to the route location). For example, "When you see the castle on the top of the hill to the left, you will be approximately five minutes from a fork. Take the right side."

In some embodiments, one or more additional landmarks are available between a registered landmark and the user's current location. The presentation module 422 can supplement the guidance with the additional landmarks. For example, "After you pass a statue on the right, go straight along a long downhill and turn right at the third traffic light."

Figure 5:
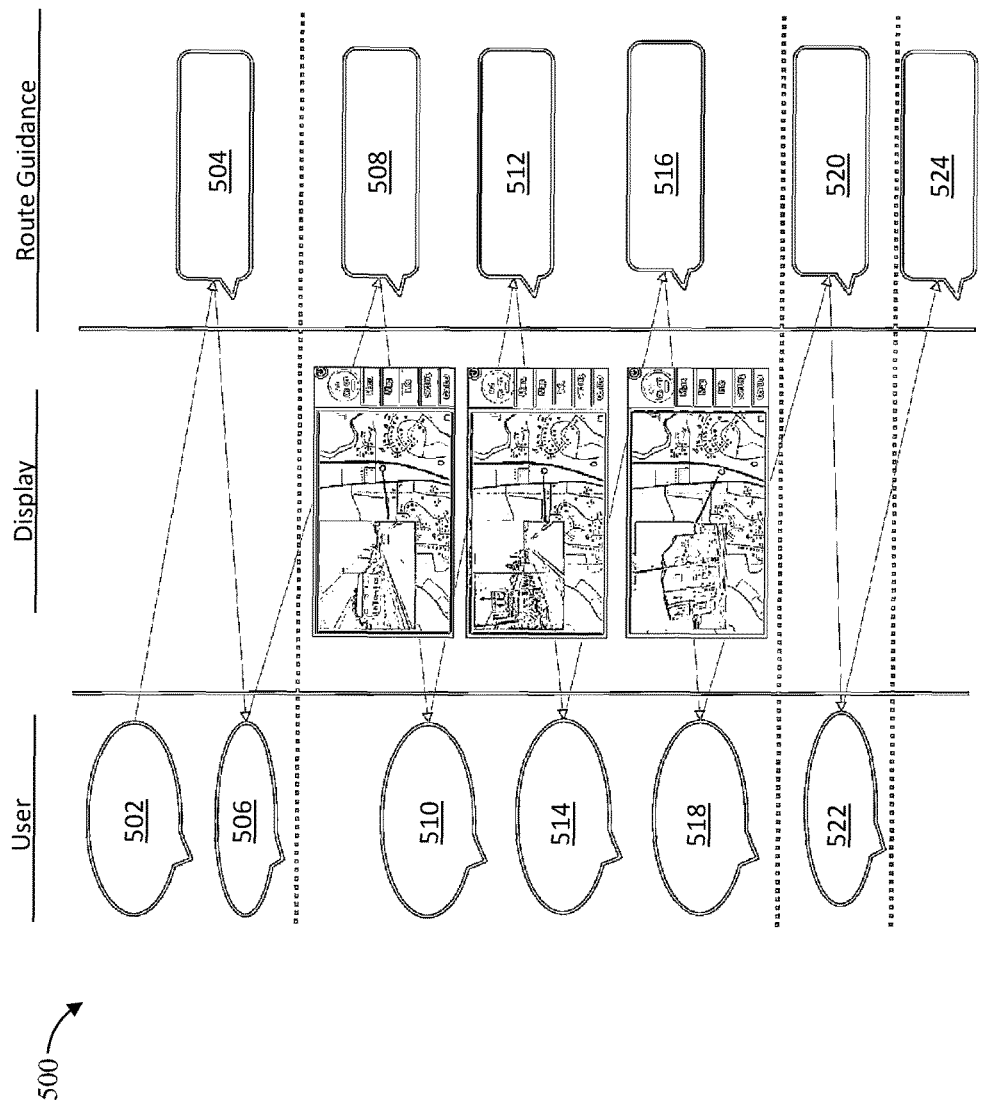
FIG. 5 depicts a flow diagram of a method for implementing the presentation and selection of candidate landmarks according to one or more embodiments of the present invention.

FIG. 5 illustrates a flow diagram of a method 500 for implementing the presentation and selection of candidate landmarks according to one or more embodiments. As shown at block 502, a trigger (here, a speech trigger uttered by a user, e.g., "Oh, I should've made a turn there.") is detected by the landmark recording module 408 according to one or more embodiments.

As shown at block 504, the landmark recording module 408, detecting that the speech trigger includes user conversations indicating a navigation error, asks the user if the user would like to record a landmark to avoid similar navigational issues in the future (e.g., "Would you like to record a landmark for this location?").

As shown at block 506, the user approves the presentation of candidate landmarks (e.g., "Yes, present landmarks."). In response, at block 508 the landmark recording module 408 presents the first candidate landmark on a display of the presentation module 422 according to one or more embodiments.

As shown at block 510, the user rejects the first candidate landmark (e.g., "That's not so visible. Are there other candidates?"). In response, at block 512 the landmark recording module 408 presents a second candidate landmark on the display (e.g., "How about this sign?").

As shown at block 514, the user rejects the second candidate landmark (e.g., "Too small. Give me another one."). In response, at block 516 the landmark recording module 408 presents a third candidate landmark on the display (e.g., "How about this building?").

As shown at block 518, the user accepts the third candidate landmark (e.g., "Ah, I remember this. I'll take it."). In response, at block 520 the landmark recording module 408 presents candidate metadata to the user ("Yellow, two-story building.").

As shown at block 522 the user accepts the candidate metadata ("Yes, that is correct."). In response, at block 524 the landmark recording module 408 tags the third candidate landmark with the accepted route metadata, stores the landmark in the image and landmark database 406, and informs the user ("The yellow, two-story building has been saved as a landmark.") according to one or more embodiments.

Additional processes also can be included, and it should be understood that the processes depicted in FIG. 5 represent illustrations, and that other processes can be added or existing processes can be removed, modified, or rearranged without departing from the scope and spirit of the present invention. For example, the user could request additional metadata, or entirely different metadata, according to one or more embodiments. In another example, the user could suspend the process at any time for later completion, according to one or more embodiments.

Figure 6:
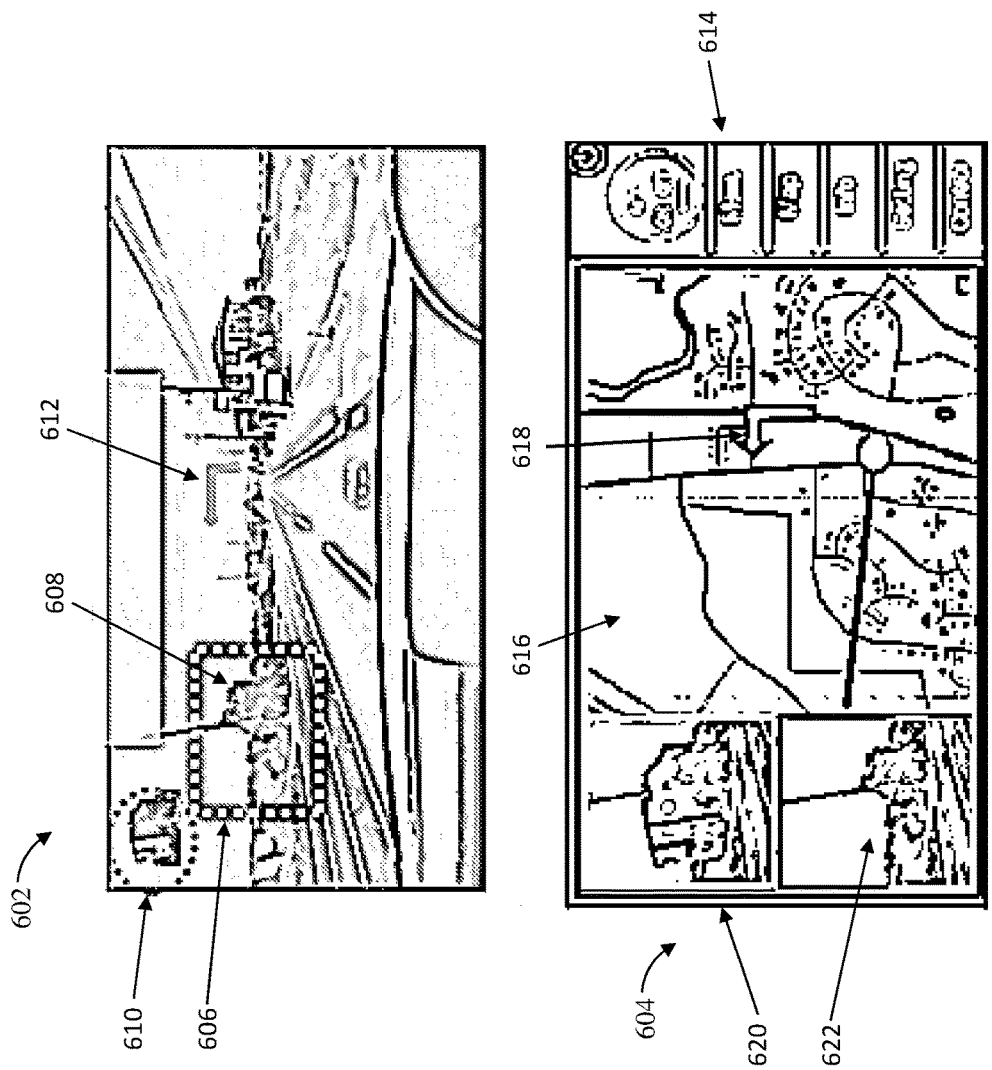
FIG. 6 depicts a user view of a HUD and a display for implementing the presentation of landmarks according to one or more embodiments of the present invention.

FIG. 6 illustrates a user view of a HUD 602 and a display 604 for implementing the presentation of landmarks according to one or more embodiments. The HUD 602 includes a visual guidance 606 (here, a broken-line frame) framing a landmark 608. A previously registered image 610 of the landmark 608 is provided adjacent to the visual guidance 606. In this manner, the user can quickly compare the visual guidance 606 to the registered image 610 of the landmark 608. The HUD 602 also includes a turn signal 612. The display 604 includes a user interface 614 (e.g., Map, Info, Setting, and Menu buttons) and a map display 616 having a turn signal 618 according to one or more embodiments. The display 604 also includes a visual guidance 620 and a comparison image 622. In some embodiments, the visual guidance 620 depicts a zoomed in view of the landmark 608 as captured by the camera 402 in real-time.

Figure 7:
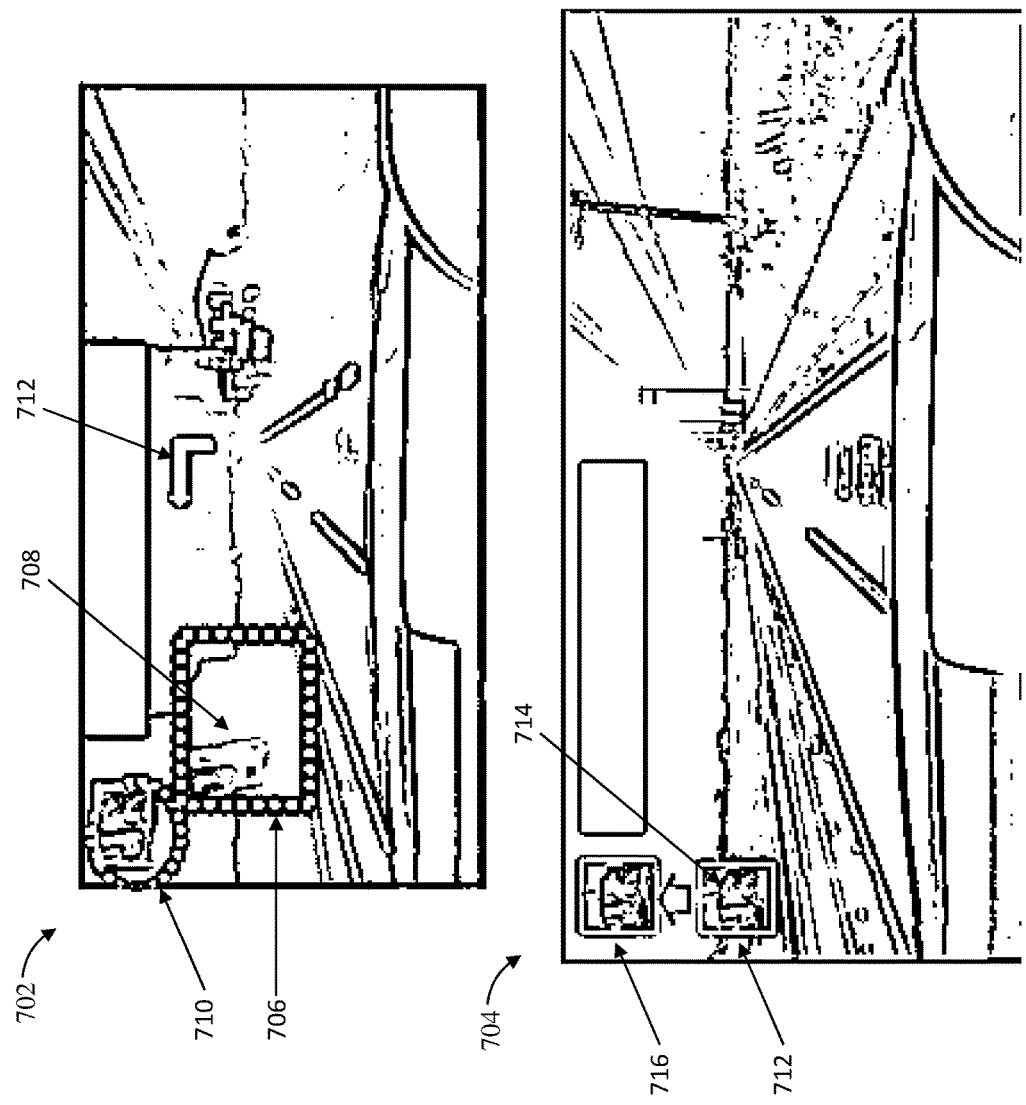
FIG. 7 depicts a user view of additional HUDs for implementing the presentation of landmarks according to one or more embodiments of the present invention.

FIG. 7 illustrates a user view of a HUD 702 and a HUD 704 for implementing the presentation of landmarks according to one or more embodiments. The HUD 702 includes a visual guidance 706 framing a difficult to see landmark 708 (perhaps, e.g., the landmark 708 is not obstructed but is difficult to see at night). A previously registered image 710 depicting the landmark 708 under daylight conditions is provided adjacent to the visual guidance 706. In this manner, the user is able to view an image of the landmark 708 under better visibility conditions. The HUD 704 includes a visual guidance 712 depicting an anticipated registered landmark 714 a kilometer ahead on the driver's route. A comparison image 716 showing that the landmark 714 has changed color is provided adjacent to the visual guidance 712. In this manner, the user is able to anticipate the visual change in the landmark 714 and more easily spot the landmark 714 along the route.

The present techniques can be implemented as a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry and to perform aspects of the present invention.

Aspects of the present invention are described herein with reference to flowchart illustrations and/or block diagrams of methods, apparatus (systems), and computer program products according to aspects of the present invention. It is understood that each block of the flowchart illustrations and/or block diagrams, and combinations of blocks in the flowchart illustrations and/or block diagrams, can be implemented by computer readable program instructions.

These computer readable program instructions can be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It is understood that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method comprising:
   receiving, by a processor, image data comprising one or more landmarks;
   identifying, by the processor, a candidate landmark within the image data;
   presenting, by the processor, the candidate landmark to a user;
   in response to the user accepting the candidate landmark, storing, by the processor, an image of the candidate landmark and a location of the candidate landmark;
   comparing, by the processor, a position of the user to the location;
   determining, by the processor, whether the position is within a threshold distance of the location;
   in response to determining that the position is within a threshold distance of the location, comparing, by the processor, the stored image of the candidate landmark to a current image of the candidate landmark in the image data to identify a change in a visual appearance of the candidate landmark; and
   presenting, by the processor, the change in the visual appearance of the candidate landmark to the user.

2. The computer-implemented method of claim 1, further comprising:
   in response to the user rejecting the candidate landmark, presenting, by the processor, a new candidate landmark to the user.

3. The computer-implemented method of claim 1, further comprising:
   in response to the user accepting the candidate landmark, tagging, by the processor, the candidate landmark with landmark metadata.

4. The computer-implemented method of claim 3, wherein the metadata comprises GPS coordinates, a landmark name, a landmark location, a shape, a color, a size, a type, a time, weather at the time, a season, a month, a year, a direction, a relative position, or a user recording.

5. The computer-implemented method of claim 1, wherein receiving the image data further comprises receiving, by the processor, the image data from a vehicle-mounted camera.

6. The computer-implemented method of claim 1, wherein identifying a candidate landmark within the image data is in response to receiving a trigger.

7. The computer-implemented method of claim 6, wherein the trigger comprises contextual user speech triggers, user command triggers, automatic route triggers, third party triggers, or user selection triggers.

8. The computer-implemented method of claim 1, wherein identifying a candidate landmark within the image data further comprises detecting a line of sight of the user.

* * * * *